US007618241B2

(12) United States Patent
Kuperus

(10) Patent No.: US 7,618,241 B2
(45) Date of Patent: Nov. 17, 2009

(54) FUEL PUMP

(75) Inventor: Peter P. Kuperus, Cass City, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 682 days.

(21) Appl. No.: 11/144,344

(22) Filed: Jun. 3, 2005

(65) Prior Publication Data

US 2006/0275154 A1 Dec. 7, 2006

(51) Int. Cl.
*F04B 17/03* (2006.01)
*F01D 1/12* (2006.01)
*H02K 21/26* (2006.01)

(52) U.S. Cl. .................... 417/353; 417/354; 417/423.7; 415/55.1; 310/154.05; 310/268

(58) Field of Classification Search ................ 417/353, 417/354, 423.7; 415/55.1–55.7; 310/87, 310/154.05, 154.06, 268
See application file for complete search history.

(56) References Cited

U.S. PATENT DOCUMENTS 3,171,356 A * 3/1965 Pensabene .................. 417/357
3,997,806 A * 12/1976 Noto et al. .................. 310/268
5,192,184 A * 3/1993 Nobuo et al. ............. 415/169.1
5,545,017 A 8/1996 Strohl et al.
5,580,213 A * 12/1996 Woodward et al. ......... 415/55.1
6,280,157 B1 * 8/2001 Cooper .................... 417/423.7
6,808,371 B2 10/2004 Niwatsukino et al.

FOREIGN PATENT DOCUMENTS

| | | | |
|---|---|---|---|
| DE | 34 23 316 | A1 | 1/1986 |
| DE | 43 14 515 | A1 | 11/1994 |
| DE | 43 41 564 | A1 | 6/1995 |
| WO | WO 01/81769 | A | 11/2001 |
| WO | WO 03/027504 | A | 4/2003 |

* cited by examiner

*Primary Examiner*—Charles G Freay
(74) *Attorney, Agent, or Firm*—Reising Ethington P.C.

(57) ABSTRACT

A fuel pump has a housing defining a cavity. A rotor of an electric motor is carried in the cavity for rotation about a drive axis. An annular pump impeller is supported in the cavity separate from the rotor and is driven by the rotor for rotation about the drive axis.

22 Claims, 3 Drawing Sheets

FUEL PUMP

FIELD OF THE INVENTION

This invention relates generally to fuel systems, and more particularly to fuel pumps.

BACKGROUND OF THE INVENTION

Vehicle fuel tanks, such as those in automotive or recreational vehicle applications, are often located in relatively confined areas due to surrounding vehicle components. As such, it can be challenging to position a fuel tank on the vehicle in the desired location without interfering with an adjacent component. As a result, fuel tank shapes are often compromised and complex to fit within an available space. When designing the fuel tank to fit within the available space, consideration must be given to the size and shape (envelope) of a fuel pump within the fuel tank. The fuel pump envelope can further complicate the fuel tank design and its ability to fit within the available space.

SUMMARY OF THE INVENTION

A fuel pump has a housing defining a cavity, a rotor received in the cavity for rotation about a drive axis, and an annular impeller supported in the cavity separate from the rotor and driven by the rotor for rotation about the drive axis. In one embodiment, the rotor and impeller enable design of a fuel pump with a relatively small size or envelope. This facilitates incorporation of the fuel pump within a fuel tank and can improve design freedom of the fuel tank. As such, the fuel tank is better able to be packaged within a relatively small space, such as under a seat of a vehicle.

Some of the potential objects, features and advantages of at least some embodiments of this invention include providing a fuel pump that has a small envelope, enables a fuel tank incorporating the fuel pump to have a small envelope, provides more freedom to the design of a fuel tank, may be constructed having a brush-type or brushless-type motor, improves tolerance constraints for components in the fuel pump, has a reduced number of parts, is of relatively simple design, is efficient in use and economical in manufacture and assembly, and has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
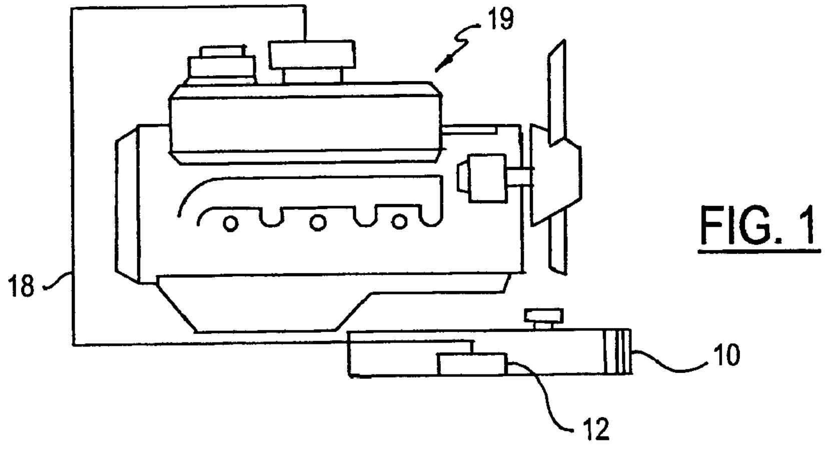
FIG. 1 is a schematic view of a fuel system for an internal combustion engine and including a fuel tank having a fuel pump therein.

Referring in more detail to the drawings, FIG. 1 illustrates a fuel tank 10 with a low profile fuel pump 12 therein for receiving liquid fuel through an inlet 14 (FIG. 2) of the pump 12 and supplying liquid fuel under pressure through an outlet 16 of the pump 12 and through a fuel line 18 to an internal combustion engine 19, such as in a passenger vehicle or recreational vehicle (not shown), for example. In accordance with one presently preferred embodiment of the invention, the fuel tank 10 is constructed having a relatively low profile, thereby being suitable for placement in relatively confined areas of the vehicle, such as beneath a seat of the vehicle, for example. The reduced profile of the fuel pump 12 and fuel tank 10 allow the components adjacent to the fuel tank 10 to remain more flexible in design, thereby reducing the overall cost and design concerns associated with the design and assembly of the vehicle. Additionally, to further improve the effectiveness and reliability of the fuel pump 12, as well as the efficiency in assembling the fuel pump 12, the number of components of the fuel pump 12 is minimized. It should be recognized that the fuel pump 12 may be incorporated into the fuel tank 10 in a variety of ways, and though shown disposed on a bottom surface of the fuel tank 10, it could be carried within a fuel module (not shown), or it could be carried by or mounted to other surfaces of the fuel tank 10, as desired for the intended application.

Figure 2:
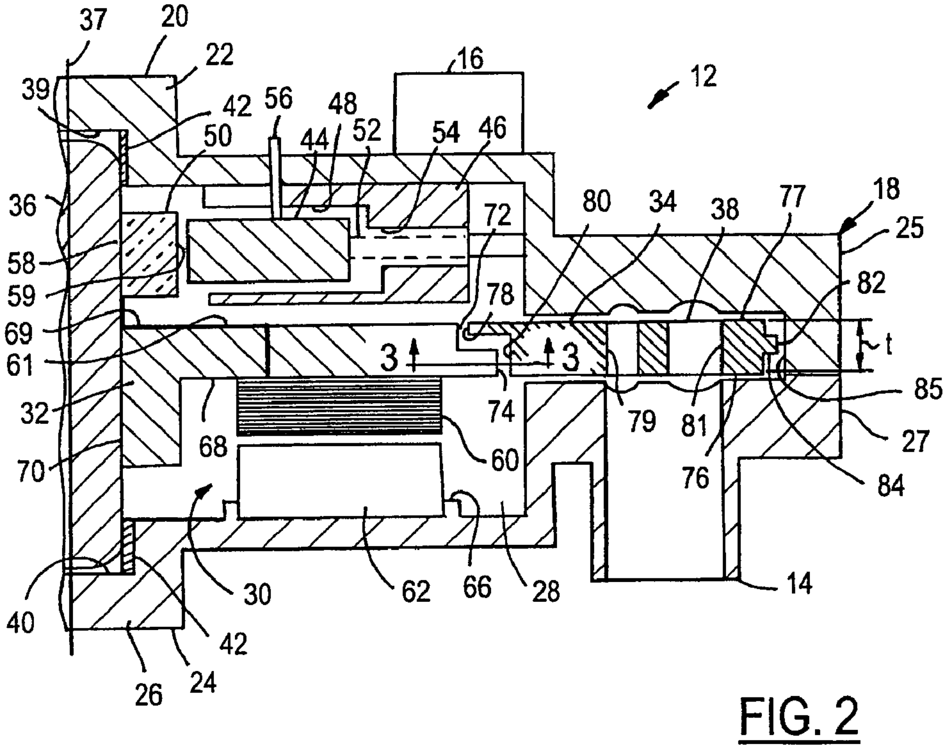
FIG. 2 is a partial cross-sectional side view of a fuel pump constructed according to one embodiment of the invention.

As best shown in FIG. 2, in one exemplary embodiment the fuel pump 12 includes a housing 18 that preferably has an upper cap 20 with an upper wall 22 and a lower cap 24 with a lower wall 26. Upon joining the upper and lower caps 22, 26, preferably about their peripheries 25, 27, respectively, such as by clamping in an outer housing, or through a weld joint or an adhesive, for example, the upper and lower walls 22, 26 are spaced from one another, at least in part, to define an inner cavity 28. The cavity 28 is sized to receive a motor 30, a generally disc-shaped rotor 32, and an annular impeller 34. The rotor 32 is carried by a shaft 36 in the cavity 28 for conjoint rotation with the shaft 36 relative to the upper and lower caps 20, 24 about a drive axis 37. The impeller 34 is supported in the cavity 28 separate from the rotor 32 and extends radially outwardly from the rotor 32 for rotation about the drive axis 37 in response to rotation of the rotor 32 to pump liquid fuel under pressure to the engine 19.

The inner cavity 28 includes a peripheral fluid chamber 38 in which the impeller 34 rotates. The outlet 16 in the upper cap 20 is preferably radially and circumferentially offset from the inlet 14 in the lower cap 24, wherein a lower pressure or suction is created at the inlet 14, and a high pressure at the outlet 16, as is commonly known in fuel pumps. The upper and lower caps 20, 24 preferably have centrally located shaft housings 39, 40, respectively, arranged for axial alignment with one another to carry the shaft 36 for rotation in the cavity 28. The shaft housings 39, 40 desirably having recessed bores sized for receipt of a bushing 42 that journals the shaft 36 for rotation.

The motor 30 of the fuel pump 12 is represented in FIG. 2 as a DC brush-type motor. The motor 30 has at least one and preferably a pair of brushes 44 preferably carried by one of the upper and lower walls 22, 26, and shown here as being carried by the upper wall 22 via separate brush housings 46.

Each brush housing 46 has an inner pocket 48 sized to slidably receive a complementarily sized brush. The brush housing 46 preferably is carried by the upper wall 22 such as by an adhesive, snap fit, weld, or other connection thereto. Each brush 44 is maintained in electrical communication with a DC power source, such as a vehicle battery (not shown), via electrically conductive blades or pins 56 extending into each brush 44 with a wire (not shown) connecting the pins 56 to the power source. As is known with brush-type DC motors, each brush 44 is generally maintained in electrical communication with a commutator 50, and the brushes 44 are shown here as being located radially outward from the commutator 50. Each brush is preferably yieldably biased against the commutator 50, such as by a spring 52, for example a coil spring or leaf spring. The spring 52 imparts a force on the brush 44, thereby biasing the brush 44 radially inwardly into frictional engagement with the commutator 50. To facilitate incorporating the spring 52, the brush housing 46 desirably has an opening 54 sized to allow the spring 52 to pass therethrough radially between a surface of the upper wall 22 and the brush 44.

The commutator 50 is generally annular and has a through bore 58 preferably sized for a press fit on the shaft 38, and an outer surface 59 arranged for electrical communication with the brushes 44. The commutator 50 is carried by the shaft 38 for rotation with the shaft 38, while remaining in electrical communication with brushes 44. In addition to being in electrical communication with the brushes 44, the commutator 50 is also in electrical communication with a plurality of electrically energizable coils 60 via a plurality of wires 61.

The coils 60 are preferably carried for rotation on the rotor 32 and are preferably distributed in an equally spaced concentric pattern about the axis 37. Each coil 60 is preferably formed of a wound coil wire in a generally flat disc or pancake shape. The coils 60 are preferably attached to the rotor 32 via an adhesive, such as an overlay of epoxy, for example, and are axially spaced a predetermined axial distance from a plurality of permanent magnets 62 for magnetic communication therewith.

The magnets 62 are preferably disc-shaped and are preferably sized to closely approximate the size of the coils 60. Each magnet 62 has one side 64 attached to the lower wall 26 via an adhesive and/or non-conductive retainer 66, preferably formed from plastic. As shown in FIG. 2, the retainers 66 may be formed as one piece with the lower cap 24, or may be attached thereto via an adhesive, or weld or in the alternative, may be snap-fit to the lower wall 26. The magnets 62 preferably are disposed concentrically about the axis 37 and are circumferentially spaced from one another to maintain the desired magnetic communication with the coils 60.

Figure 3:
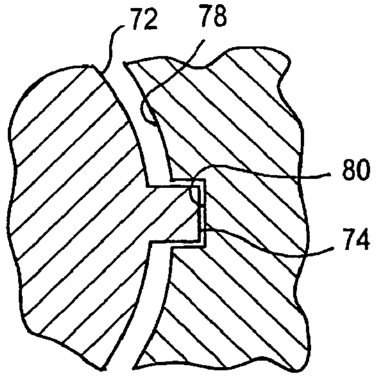
FIG. 3 is an enlarged cross-sectional view taken generally along line 3-3 of FIG. 2.

The disc-shaped rotor 32 has opposite upper and lower sides 68, 69, respectively, and a through bore 70 preferably sized to receive the shaft 36. The rotor 32 may be keyed to the shaft 36 or otherwise received to be driven for rotation with the shaft 36 such as through a non-circular bore 70 on a complementarily shaped portion of the shaft 36. One side 68 of the rotor 32 has the coils 60 attached thereto, and the other side 69 of the rotor 32 is axially spaced from each brush housing 46 to permit generally free rotation of the rotor 32 conjointly with the shaft 36. As best shown in FIGS. 2 and 3, the rotor 32 has an outer periphery 72 with a plurality of drive members, represented here, by way of example and without limitations, as fingers or tabs 74 extending radially outwardly therefrom. The tabs 74 are preferably spaced circumferentially equidistant from one another and have a predetermined size and shape to be operably coupled for mating engagement with the impeller 34 to impart a force on the impeller 34 and rotate the impeller 34 in response to rotation of the rotor 32. The rotor 32 is preferably formed from a rigid non-conductive material, such as a generally hard, resilient plastic, for example.

The annular impeller 34 is represented here, by way of example and without limitation, as a so-called dual channel single-stage rim-style impeller, although it is contemplated that other types of impellers could be used, such as by way of example and without limitation, single channel impellers. The impeller 34 has a pair of channels 79, 81 in parallel relative to one another extending axially through and circumferentially around the impeller 34 and spaced radially inward from an outer periphery 82 of the impeller 34. Each channel 79, 81 has a plurality of circumferentially spaced apart blades therein. The impeller 34 is sized for rotation within the fluid chamber 38 with a minimal amount of friction. The impeller 34 has opposite sides 76, 77 defining a thickness (t) of the impeller 34, wherein the thickness (t) is chosen to provide a predetermined axial clearance that preferably is between about 0.015-0.030 inches from the upper and lower walls 22, 26. As such, the impeller 34 is received with a close axial fit in the fluid chamber 38, thus, minimizing the amount of axial play of the impeller 34 within the chamber 38, and reducing the amount of noise and fuel leakage generated by the pump.

The impeller 34 has an inner periphery 78 with at least one driven member, represented here as a pocket 80 extending radially therein. Preferably, a plurality of pockets 80 are provided in the impeller in spaced relation for receipt of corresponding tabs 74 on the rotor 32 to drivingly couple the impeller 34 to the rotor 32. As shown in FIGS. 2 and 3, the pockets 80 are generally sized to allow the tabs 74 to be received in a relative close, but slightly loose fit, such as about 0.003-0.007 inches radial and axial clearance, for example. As a result, a desired amount of relative axial and radial movement between the tabs 74 and the pockets 80 allows the impeller 34 to automatically align itself within the fluid chamber 38 independently from any bias imparted by the rotor 32 as the rotor 32 rotates the impeller 34. The axial and radial clearances between the tabs 74 and the pockets 80 permit the manufacturing tolerances of the rotor 32 and the impeller 34 to be increased, thereby reducing their associated manufacturing costs. Further, the ability of the impeller 34 to automatically align itself within the fluid chamber 38 reduces the amount of wear between the impeller 34 and the upper and lower walls 22, 26, thereby improving the useful life of the pump 12, while also reducing the amount of noise generated by the pump 12 in use. To further reduce the potential for rotational friction between the impeller 34 and the cavity walls, and to limit the radial movement of the impeller 34 relative to the drive axis 37, the impeller 34 preferably has an outer periphery 82 with a radially outwardly extending rib 84 spaced a predefined distance from at least one of the upper and lower walls 22, 26. The rib 84 preferably has a reduced axial thickness compared to the thickness (t) of the impeller 34 and may extend about the entire circumference of the impeller 34, or it can be constructed as separate circumferentially spaced ribs with radially recessed pockets extending between each rib. With the rotor 32 and impeller 34 being separate from one another, they can be readily constructed from different materials, as desired.

In use, the brushes 44 receive an electric current from the DC power source via the conductor pins 56, whereupon the brushes 44 communicate electrically with the commutator 60. The commutator 60 sends an electric current to the separate coils 60 attached to the rotor 32. As is known in so-called ironless DC motors, the coils 60 emit a magnetic field in a controlled direction, generally toward the opposing permanent magnets 62 attached to the lower cap 24, thereby causing the rotor 32, and thus, the shaft 36 to rotate about the drive axis 37. As the rotor 32 rotates, the tabs 74 engage the impeller 34 within the pockets 80 and apply essentially tangential forces to the impeller which cause the impeller 34 to rotate in response to rotation of the rotor 32. The impeller 34 is generally free to float within the fluid chamber 38 as it rotates. As such, the impeller 34 is able to self-align in a low friction path of rotation within the fluid chamber 38, while preferably being limited in axial and radial movement by the predefined size of the chamber 38, wherein the chamber 38 is defined by the upper and lower walls 22, 26 and the circular end wall 85. The radial play is further controlled by the rib 84 of the impeller 34. The low friction further results from a hydrodynamic film of liquid fuel formed adjacent the opposite sides 76, 77 of the impeller. As the impeller 34 rotates, the liquid fuel enters through the inlet 14 at a low pressure into the channels 79, 81, between the blades therein and is subsequently discharged at a relatively high pressure at the outlet 16. As such, liquid fuel is moved via the relatively low pressure through the inlet 14, circulated within the channels 79, 81 and the chamber 38 by the blades of the rotating impeller, and discharged at a relatively high pressure through the outlet 16 and directed to the engine 19.

Figure 4:
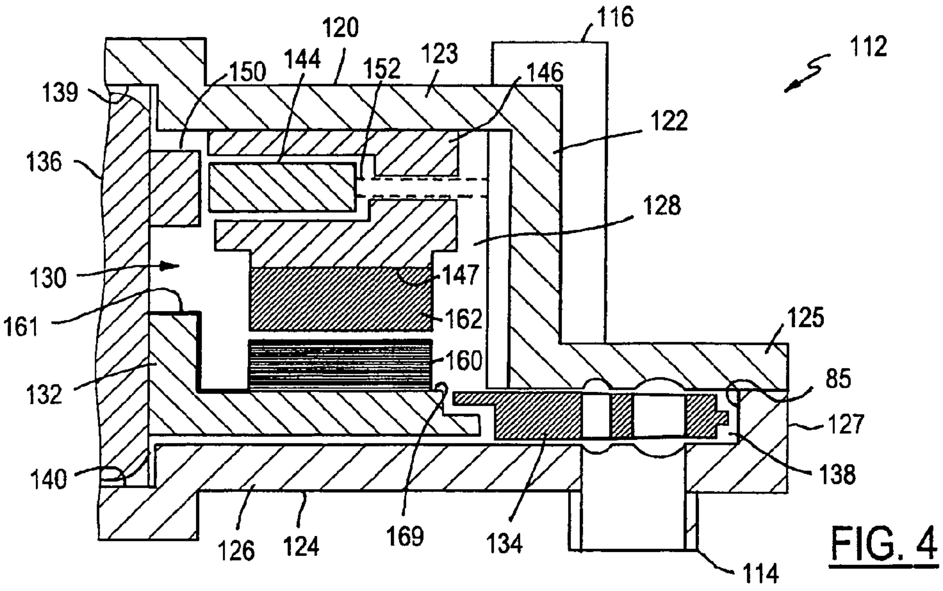
FIG. 4 is a partial cross-sectional side view of a fuel pump constructed according to another embodiment of the invention.

In FIG. 4, a fuel pump 112 is shown that is constructed according to another embodiment of this invention. The pump 112 has an upper cap 120 with an annular wall 122 extending between a radially outwardly extending flange 125 at one end, and an end wall 123 at its other end. The pump 112 has a lower cap 124 with a generally flat wall 126 with an axially extending annular flange 127 at its outer periphery. An inner cavity 128 and an annular fluid chamber 138 are defined between the upper and lower caps 120, 124. The annular fluid chamber 138 is sized for receipt of an impeller 134, wherein the impeller 134 preferably has the same construction as the impeller 34 for operable coupling to a rotor 132. The upper cap 120 has an outlet 116, while the lower cap 124 has an inlet 114, as described above. The upper and lower caps 120, 124 preferably have centrally located housings or recesses 139, 140 arranged for receipt of a shaft 136, as described in the first embodiment.

The pump 112 has a motor 130 that is generally similar to the motor 30 described in the first embodiment, however the arrangement of at least some of the motor components within the cavity 128 is different. The motor 130 has at least one and generally a pair of brushes 144 preferably carried in a brush housing 146 from the upper wall 122, as previously described above. The brush housing 122, though similar to the brush housing 46 in the first embodiment, provides circumferentially spaced surfaces 147 for attachment of separate permanent magnets 162. The magnets 162 may be adhered directly to the surfaces 147 using any suitable adhesive, or they may be carried via separate magnet housings (not shown) either formed as one piece with the brush housing 146, or separately attached thereto, such as by way of a weld, snap fit or adhesive. Each brush 144 is preferably maintained in biased engagement with a commutator 150 by a spring 152, as described above. The commutator 150 is carried for rotation with the shaft 136 and is in electrical communication with a plurality of coils 160 via a plurality of wires 161.

The coils 160 are preferably attached to the rotor 132 that is carried for rotation with the shaft 136. The coils 160 are attached to an upper side 169 of the rotor 132. The coils 160 are desirably spaced circumferentially equidistant from one another and are axially spaced a predetermined distance from the permanent magnets 162. The operation of the fuel pump 112 is generally the same as described in the first embodiment, and thus is not repeated hereafter.

Figure 5:
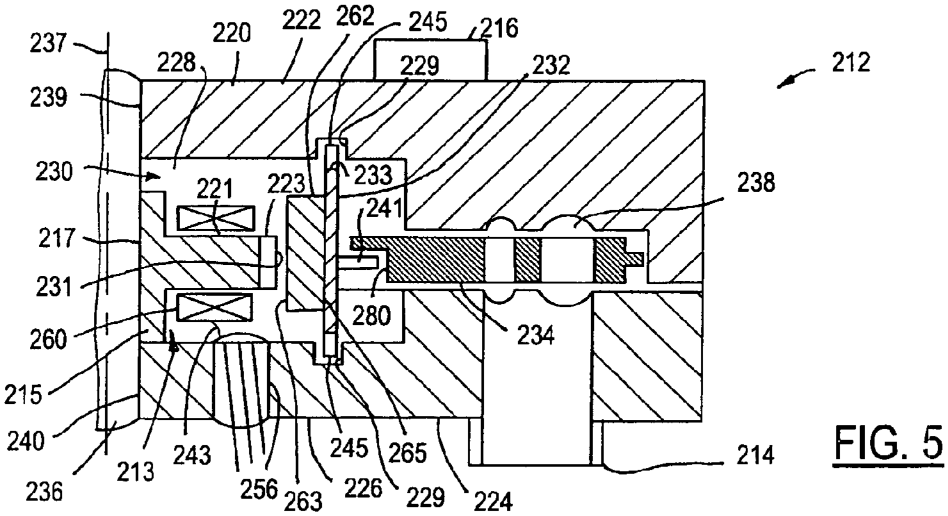
FIG. 5 is a partial cross-sectional side view of a fuel pump constructed according to yet another embodiment of the invention.

A fuel pump 212 constructed according to another embodiment of the invention is shown in FIG. 5, and has an upper cap 220 with an upper wall 222 and a lower cap 224 with a lower wall 226. Upon connecting together the upper and lower caps 220, 224, the upper and lower walls 222, 226 are spaced from one another, at least in part, to define a cavity 228, including a peripheral fluid chamber 238 sized for rotation of an impeller 234. The impeller 234 preferably has the same general construction as the impellers 34, 134 previously described. The cavity 228 is sized to receive at least in part a brushless motor 230 with a generally annular rotor 232 with at least one permanent magnet 262 attached thereto. At least one of the upper and lower caps 220, 224, and as shown here both caps 220, 224, cooperate to closely receive, at least in part, the rotor 232 for guided rotation in an annular channel 229 extending generally concentrically about a drive axis 237. The channels 229 in the caps 220, 224 are preferably axially aligned in mirrored relation with one another to facilitate guiding the rotor 232 with a relatively low amount of friction in use. As in the previous embodiments, a generally flat, annular impeller 234 is supported in the fluid chamber 238 separately from the rotor 232 and extends radially outwardly from the rotor 232 for rotation about the drive axis 237 in response to rotation of the rotor 234.

The upper and lower caps 220, 224 preferably have centrally located shaft housings 239, 240, with bores axially aligned with one another and sized for a tight friction or press fit with a shaft 236. Accordingly, the shaft 236 preferably remains fixed relative to the upper and lower caps 220, 224, with a fluid tight seal being maintained therebetween.

The brushless motor 230 has an electrically energizable stator 213 fixed about the central drive axis 237, and shown here as being supported by the fixed shaft 236. The stator 213 has a stator housing 215 with a through bore 217 sized for a tight friction fit about the shaft 236 so that the stator 213 remains stationary relative to the shaft 230 and the caps 220, 224. It should be recognized that the stator 213 may be welded, adhered, or otherwise attached, or formed as one piece with the shaft. The stator housing 215 preferably has arms 221 extending radially outwardly and spaced circumferentially equidistant from one another. The arms 221 preferably have T-shaped ends 223 having an arcuate outer surface 231, wherein the ends 223 facilitate winding electrically energizable stator coils 260 about the arms 221.

The stator coils 260 preferably are constructed from a plurality of wire windings, though it should be recognized that they may be constructed of separate, generally flat electrically laminated conductive pads of a suitable metallic material, by way of example and without limitation. The stator coils 260 are arranged for electrical communication with an electrical power source, such as a vehicle battery, for example, via an electrical connector 256, shown here as passing through the lower cap 224, by way of example and without limitation. Each stator coil 260 may be separately electrically communicated with a separate connector 256, or the stator coils 260 may be in electrical communication with one another so that a single electrical connector 256 may communicate electrically with each stator coil 260 via one or more wires 243.

Figure 6:
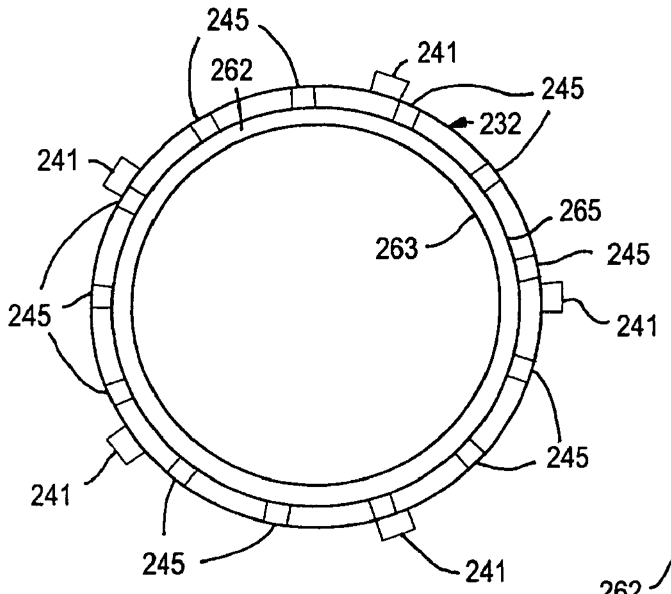
FIG. 6 is a plan view of a rotor and magnet assembly of the fuel pump of FIG. 5.

As shown in FIG. 6, the permanent magnet 262 is preferably constructed as an annular ring magnet 262 having a circular or cylindrical inner surface 263 carried in a predetermined radially outward spaced relation from the outer surfaces 231 (FIG. 5) of the stator housing 215. As such, the magnet 262 is maintained in magnetic communication with the stators 260. The magnet 262 has an outer circumferential surface 265 preferably sized for a close or interference fit within the rotor 232 to facilitate attachment of the magnet 262 to the rotor 232.

Figure 7:
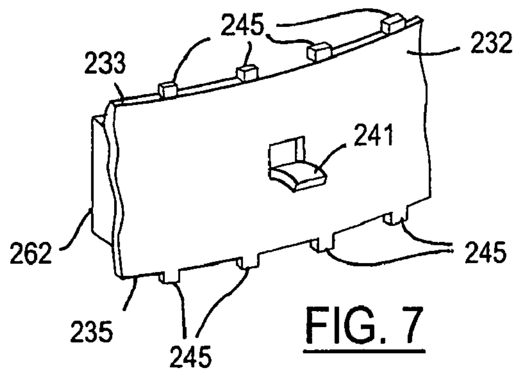
FIG. 7 is a partial perspective view of the rotor and magnet assembly of FIG. 6.
Figure 10:
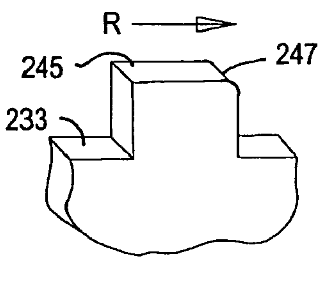
FIG. 10 is an enlarged view of the encircled area 10 of FIG. 9.

The rotor 232 is preferably constructed as a continuous cylindrical band of relatively rigid resilient material, such as steel, by way of example and without limitation. Being constructed of a ferrous metallic material allows the rotor 232 to act as a flux tube of sorts, thereby acting to direct the magnetic field emitted by the magnet 262, as desired. As best shown in FIG. 5, the rotor 232 is generally rectangular in cross-section with sides extending generally parallel to the axis 237 between an upper edge 233 and a lower edge 235. As shown in FIG. 7, the rotor is preferably received at least in part within the channels 229 to facilitate guiding the rotor 232 as it rotates about the axis 237. The rotor 232 preferably has a plurality of fingers 245 extending axially in opposite directions from the edges 233, 235, of the rotor with the fingers 245 being sized for a close, yet loose receipt within the channels 229 (FIG. 5) in the upper and lower caps 220, 224. As best shown in FIG. 10, preferably the fingers 245 have a leading edge with a generally chamfered or rounded surface 247 to facilitate rotation of the rotor 232 in a direction (R) within the channels 229 by reducing the friction between the fingers 245 and the upper and lower caps 220, 224. The fingers 245 are preferably spaced circumferentially equidistant from one another, and the fingers 245 on one edge 233 are axially aligned with the fingers 245 on the other edge 235 to provide more uniform loading and wear on the fingers 245. It should be recognized that the rotor 232 can be made with any number of fingers, or otherwise can be constructed without the fingers so that the upper and lower edges 233, 255 of the rotor wall are received for guided rotation in the channels 229, if desired.

The rotor 232 has at least one drive member, represented here as a plurality of radially outwardly extending tabs 241 arranged for operable engagement with a driven member, such as in separate pockets 280, by way of example, within an inner periphery of the impeller 234 to drive the impeller 234 in response to rotation of the rotor 232. As shown in FIG. 7, the tabs 241 are preferably integral with the rotor 232 and may be stamped and bent from a generally central portion of the rotor wall, though they could be constructed separately from the rotor 232, and thereafter attached, such as through a weld joint, for example.

In use, the fuel pump 212 receives an electric current via the electrical connector 256, whereupon the stator coils 260 are energized and produce a rotating a magnetic field that causes the permanent magnet 262 to rotate in the intended direction. The rotor 232 rotates conjointly with the magnet 262, and the tabs 241 engage the impeller 234 within the pockets 280 so that the impeller 234 rotates with the rotor 232. As such, rotation of the impeller 234 and its blades creates a relatively low pressure at the inlet 214 to move liquid fuel into pumping channels and the fluid chamber 238, and discharges fuel at a relatively high pressure through the outlet 216 to pump liquid fuel under pressure to the engine. As in the previous embodiments, the impeller 234 rotates with a minimum amount of friction due to its ability to float or align somewhat independently from the rotor 232, thereby allowing the impeller 234 to seek a self-aligned orientation within the fluid chamber 238. In addition, the rotor 232 is able to self-align within the channels 229 in the upper and lower caps 220, 224, thereby further reducing friction within the electric motor, and thus, improving the overall running efficiency of the pump 212 and motor assembly.

Figure 8:
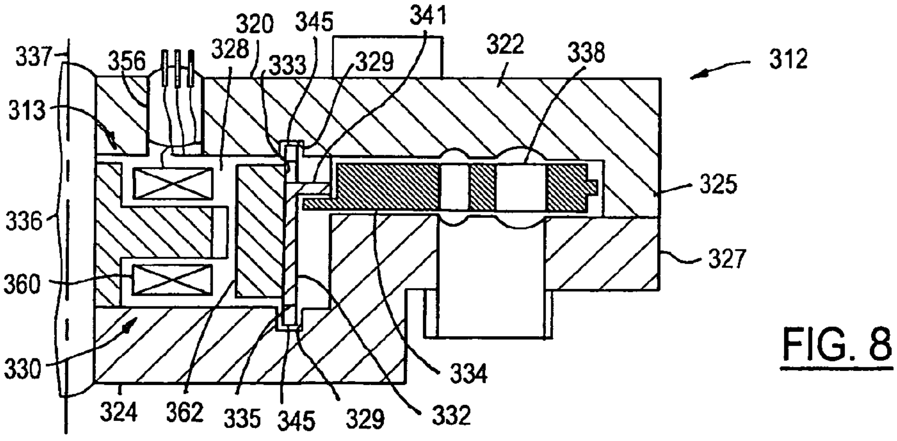
FIG. 8 is a partial cross-sectional side view of a fuel pump constructed according to yet another embodiment of the invention.

A fuel pump 312 constructed according to another embodiment of the invention is shown in FIG. 8, and has an upper cap 320 with a generally flat upper wall 322 having an annular axially extending peripheral flange 325, and a lower cap 324 having a lower wall 326 with a radially outwardly extending peripheral flange 327. Upon joining the upper and lower caps 320, 324 about their peripheries 325, 327, the upper and lower walls 322, 326 define a cavity 328, including a peripheral fluid chamber 338 sized for rotation of an impeller 334, wherein the impeller 334 preferably has the same general construction as the previous described impellers 34, 134, 234. The cavity 328 is sized to receive at least in part a brushless motor 330 which has a generally cylindrical rotor 332 with at least one permanent magnet 362 attached thereto, wherein the magnet 362 is constructed generally the same as the magnet 262 described above. At least one of the upper and lower caps 320, 324, and as shown here both caps 320, 324 cooperate to closely receive, at least in part, the rotor 332 for rotation in annular channels 329 extending generally concentrically about a drive axis 337. The channels 329 are constructed generally the same as the channels 229 in the previous embodiment, and thus, are not discussed further. As in the previous embodiments, a generally flat, annular impeller 334 is supported in the fluid chamber 338 separately from the rotor 332 and extends radially outwardly from the rotor 332 for rotation about the drive axis 337 in response to rotation of the rotor 332.

The upper and lower caps 320, 324 preferably maintain a shaft 336 stationary thereto, as in the previous embodiment pump 212, with a fluid tight seal being maintained therebetween.

The brushless motor 330 has a stator 313 fixed about the central drive axis 337, with stator coils 360 arranged for electrical communication with an electrical power source via an electrical connector 356, shown here as passing through the upper cap 324, by way of example and without limitation. The stator 313 is otherwise constructed and operates generally the same as in the previous embodiment, and thus, is not discussed hereafter.

Figure 9:
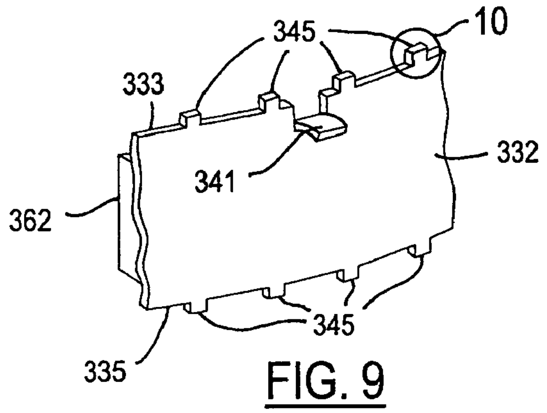
FIG. 9 is a partial perspective view of a rotor and magnet assembly of the fuel pump of FIG. 8.

The rotor 332 is constructed generally similarly as the previous embodiment rotor 232, with an upper edge 333 and a lower edge 335 preferably having fingers 345 extending axially therefrom. The rotor 332 has at least one drive member, represented here as a plurality of radially outwardly extending tabs 341 arranged for operable engagement with a driven member, such as separate pockets 380 in the impeller 334 to drive the impeller 334 in response to rotation of the rotor 332. As shown in FIG. 9, the tabs 341 are preferably integral with the rotor 232 and may be stamped and bent from the upper edge 333 of the rotor wall, though they could be constructed separately from the rotor 232, and thereafter attached, such as through a weld joint, for example. The rotor 232 is otherwise constructed generally the same as in the previous embodiment, and thus, is not discussed further.

It should be recognized that upon reading the disclosure herein, one ordinarily skilled in the art of fuel pumps would readily recognize other embodiments than those disclosed herein, with those embodiments being within the spirit and scope of the claims that follow. For example, it should be recognized that the upper and lower caps may be constructed having various configurations to define an inner cavity sized to house a motor, rotor, and impeller. In addition, the drive members on the rotor 32, 132, 232, 332 can be constructed other than as shown, such as a plurality of drive lugs, drive fingers, drive dogs, or drive gears, by way of example and without limitations, and the driven members on the impeller 34, 134, 234, 334 can be constructed having a mating companion feature for operable engagement with the drive members. Further, it should be recognized that since the impeller 34, 134, 234, 334 floats generally freely radially outwardly from the rotor 32, 132, 232, 332, that the centers of the rotor and the impeller may be offset to incorporate a gear-type drive mechanism between the rotor and impeller to achieve a gear reduction for rotating the impeller. Accordingly, the disclosure herein is intended to be exemplary, and not limiting. The scope of the invention is defined by the claims that follow.

I claim:

1. A fuel pump, comprising:

a housing having a cavity and a drive axis;

a rotor of an electric motor carried in the cavity for rotation about the drive axis;

an annular impeller supported in the cavity separate from the rotor and driven by the rotor for rotation about the drive axis; and a shaft carrying the rotor for rotation in the cavity, wherein the rotor surrounds at least a portion of the shaft and the impeller surrounds at least a portion of the rotor such that the rotor is disposed between the shaft and the impeller.

2. The fuel pump of claim 1 wherein the rotor has a drive member and the impeller has a driven member arranged for engagement with the drive member to rotate the impeller in response to rotation of the rotor.

3. The fuel pump of claim 1 further comprising a commutator, and a brush, the shaft carrying the rotor and the commutator for rotation in the cavity, and the brush being spaced radially outwardly from the commutator for electrical communication with the commutator.

4. The fuel pump of claim 1 wherein the rotor has a cylindrical wall extending generally concentrically about the drive axis.

5. The fuel pump of claim 2 wherein the drive member extends radially outwardly from the rotor and the driven member extends radially inwardly from the impeller.

6. A fuel pump, comprising:

a housing having a cavity and a drive axis;

a rotor of an electric motor carried in the cavity for rotation about the drive axis;

an annular impeller surrounding at least a portion of the rotor such that the rotor is disposed between the drive axis and the impeller, supported in the cavity separate from the rotor and driven by the rotor for rotation about the drive axis; and at least one magnet and an energizable coil spaced from said at least one magnet for magnetic communication with said at least one magnet.

7. The fuel pump of claim 6 wherein the housing has an upper wall and a lower wall, one of the upper and lower walls being arranged to carry said at least one magnet and the rotor being arranged to carry the coil.

8. The fuel pump of claim 6 further comprising a brush housing carried by one of the upper and lower walls, the brush housing being sized to receive a brush and carry said at least one magnet.

9. The fuel pump of claim 6 wherein the housing has an annular channel extending concentrically about the drive axis that is sized to receive at least part of the rotor to facilitate guiding the rotor about the drive axis.

10. The fuel pump of claim 9 further comprising an electrically energizable stator fixedly supported about the drive axis, at least one magnet carried radially outwardly from the stator by the rotor to facilitate the relative rotational movement of the rotor in response to the stator being energized.

11. The fuel pump of claim 9 wherein the rotor has a cylindrical wall extending generally parallel to the drive axis between opposite edges, at least one of the edges being sized for receipt in said channel for rotation about the drive axis.

12. The fuel pump of claim 11 wherein the rotor has a plurality of fingers spaced from one another and extending axially from at least one of the edges, the fingers being sized for receipt in said annular channel.

13. The fuel pump of claim 12 wherein the fingers have a chamfered surface to reduce the friction of the fingers within the channel during rotation of the rotor.

14. The fuel pump of claim 6 wherein the rotor has a drive member and the impeller has a driven member, the drive member being arranged to engage the driven member to impart a force on the impeller to rotate the impeller in response to rotation of the rotor.

15. The fuel pump of claim 14 wherein the housing has an annular channel sized to receive at least a portion of the rotor to facilitate guiding the rotor about the drive axis as it rotates relative to the stator.

16. The fuel pump of claim 14 wherein the housing has a pair of annular channels axially spaced and in mirrored relation from one another, at least a portion of the rotor wall being received in the channels for guided rotation of the rotor about the shaft as it rotates relative to the stator.

17. A fuel pump, comprising:

a housing having a cavity and a drive axis;

a rotor of an electric motor carried in the cavity for rotation about the drive axis; and an annular impeller supported in the cavity separate from the rotor and driven by the rotor for rotation about the drive axis wherein the impeller has a radially outwardly extending peripheral rib spaced from the housing to limit the radial movement of the rotor relative to the drive axis.

18. The fuel pump of claim 17 where the housing defines a chamber that is sized to limit the axial and radial movement of the impeller.

19. A fuel pump, comprising:

a housing having a cavity;

a shaft operably supported by the housing and extending into the cavity for rotation about a drive axis;

an annular commutator carried by the shaft for rotation about the drive axis;

at least one brush carried by the housing and spaced from the commutator and in electrical communication with the commutator;

a magnet operably supported in the cavity;

a rotor carried by and surrounding at least a portion of the shaft for conjoint rotation with the shaft and having a portion that radially overlies the magnet;

a coil carried by the rotor axially spaced from the magnet and being in electrical communication with the commutator for actuation between an energized state and a de-energized state, the coil emitting a magnetic field toward the magnet when in its energized state to facilitate rotating the rotor and the shaft about the drive axis; and an impeller carried in the cavity separate and radially outwardly from and surrounding at least a portion of the rotor and being arranged for operable engagement with the rotor for rotation of the impeller about the drive axis in response to rotation of the rotor.

20. The fuel pump of claim 19 wherein the rotor has a drive member and the impeller has a driven member, the drive member being arranged to engage the driven member to rotate the impeller in response to rotation of the rotor.

21. The fuel pump of claim 19 wherein the magnet is attached to a wall of the housing.

22. The fuel pump of claim 20 wherein the drive member extends radially outwardly from the rotor and the driven member extends radially inwardly from the impeller.

* * * * *

UNITED STATES PATENT AND TRADEMARK OFFICE

CERTIFICATE OF CORRECTION

PATENT NO. : 7,618,241 B2

APPLICATION NO. : 11/144344
DATED : November 17, 2009
INVENTOR(S) : Peter P. Kuperus It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Fourteenth Day of December, 2010

David J. Kappos

David J. Kappos
*Director of the United States Patent and Trademark Office*